US008706587B1

(12) United States Patent
Bautista, Jr. et al.

(10) Patent No.: US 8,706,587 B1
(45) Date of Patent: Apr. 22, 2014

(54) STATISTICAL PRIORITIZATION AND DETECTION OF POTENTIAL FINANCIAL CRIME EVENTS

(75) Inventors: Rogelio Olarte Bautista, Jr., St. Louis, MO (US); Daniel Clifton Kern, Charlotte, NC (US); Joan F. Pilsmaker, Milton, MA (US); Matthew R. Quinn, Wilmington, MA (US); Peter C. Richards, Pembroke, MA (US)

(73) Assignee: Bank of America Corporation, Charlotte, NC (US)

( * ) Notice: Subject to any disclaimer, the term of this patent is extended or adjusted under 35 U.S.C. 154(b) by 791 days.

(21) Appl. No.: 12/039,411

(22) Filed: Feb. 28, 2008

(51) Int. Cl.
*G06Q 40/00* (2012.01)
(52) U.S. Cl.
USPC .............................................. 705/35; 705/38
(58) Field of Classification Search
CPC ..................................................... G06Q 40/00
USPC .......................................................... 705/35
See application file for complete search history.

(56) References Cited

U.S. PATENT DOCUMENTS

| 6,112,190 | A * | 8/2000 | Fletcher et al. | 705/36 R |
|---|---|---|---|---|
| 2002/0099649 | A1 * | 7/2002 | Lee et al. | 705/38 |
| 2004/0006533 | A1 * | 1/2004 | Lawrence | 705/38 |
| 2006/0149674 | A1 * | 7/2006 | Cook et al. | 705/44 |
| 2007/0288355 | A1 * | 12/2007 | Roland et al. | 705/38 |
| 2010/0100693 | A1 * | 4/2010 | Kerley et al. | 711/154 |
| 2010/0145836 | A1 * | 6/2010 | Baker et al. | 705/30 |
| 2011/0040665 | A1 * | 2/2011 | Long | 705/35 |

* cited by examiner

*Primary Examiner* — Bruce I Ebersman
*Assistant Examiner* — John Anderson
(74) *Attorney, Agent, or Firm* — Banner & Witcoff, Ltd.; Michael A. Springs (57) ABSTRACT

Systems and methods for calculating financial crimes ratings for banking entities are provided. High risk transaction data for a plurality of similarly situated banking entities is collected. The banking entities may include banking centers, business customers, individual customers or other banking entities. Summary data is then calculated from the high risk transaction data. The summary data for a banking entity is then compared to summary data of the similarly situated banking entities to calculate the rating. Financial crimes ratings may be used to allocate investigation and enforcement resources.

10 Claims, 5 Drawing Sheets

STATISTICAL PRIORITIZATION AND DETECTION OF POTENTIAL FINANCIAL CRIME EVENTS

FIELD OF THE INVENTION

Embodiments of the present invention relate to systems and methods that are utilized to identify entities that are potentially engaging in financial crimes. More particularly, embodiments of the invention provide mechanisms for statistically rating whether an entity is likely engaged in a financial crime based on the transaction history of the entity.

DESCRIPTION OF THE RELATED ART

Financial institutions monitor customer transactions in an effort to identify financial crimes, such as the practice of filtering the proceeds of criminal activity through a series of seemingly legitimate transactions to conceal or obscure the criminal origin of the funds involved in the transactions. One method involves structuring transactions to avoid government reporting requirements. Currently in the United States, transactions that involve at least $10,000 must be reported to the government. Structuring occurs, for example, when a financial institution customer makes multiple withdrawals or deposits that are each below the reporting threshold, but when combined, exceed the reporting threshold. For example, a person who wishes to deposit $13,000 may make a first deposit of $8,000 and a second deposit of $5,000 in an attempt to avoid the reporting requirements. Financial crimes also frequently involve large cash deposits and certain wire transfers.

Financial institutions report suspicious transactions to investigatory entities, such as the U.S. Department of Treasury's Financial Crimes Enforcement Network (FinCEN). The amount of time and resources expended by financial institutions and investigatory entities can be considerable because it is often difficult to review raw financial data and accurately determine whether or not a financial crime is occurring.

Audit groups often focus on known high risk geographic regions. Devoting limited resources to specific geographic regions can result in financial crimes in other regions going unnoticed.

Therefore, there exists a need in the art for systems and methods that assist financial institutions in identifying transactions that may be related to financial crimes.

SUMMARY OF THE INVENTION

Aspects of the invention overcome at least some of the problems and limitations of the prior art by providing systems and methods that assign ratings to transaction data received from a variety of banking entities. Transaction data for a plurality of similarly situated banking entities is received. The transaction data for a particular entity may then be compared to transaction data for similarly situated entities, expected transaction data and/or the entity's prior transaction data to generate a rating. Based on the rating calculation, the potential for a potential financial crime event may be determined and routed to a business group for further evaluation.

Of course, the methods and systems disclosed herein may also include other additional elements, steps, computer-executable instructions, or computer-readable data structures. The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION

Aspects of the present invention are preferably implemented with computer devices and computer networks that allow users to exchange and process financial transaction data. Each computer device may include a variety of conventional hardware and software components. Exemplary components include: magnetic memory modules, physical memory modules, a network card, a modem, a central processor that controls the overall operation of the computer and a system bus that connects the central processor to one or more conventional hardware components. Each computer device may also include a variety of interface units and drives for reading and writing data or files. Depending on the type of computer device, a user can interact with the computer with a keyboard, pointing device, microphone, pen device or other input device. The operations of computer devices may be controlled by computer-executable instructions stored on computer-readable medium.

Figure 1:
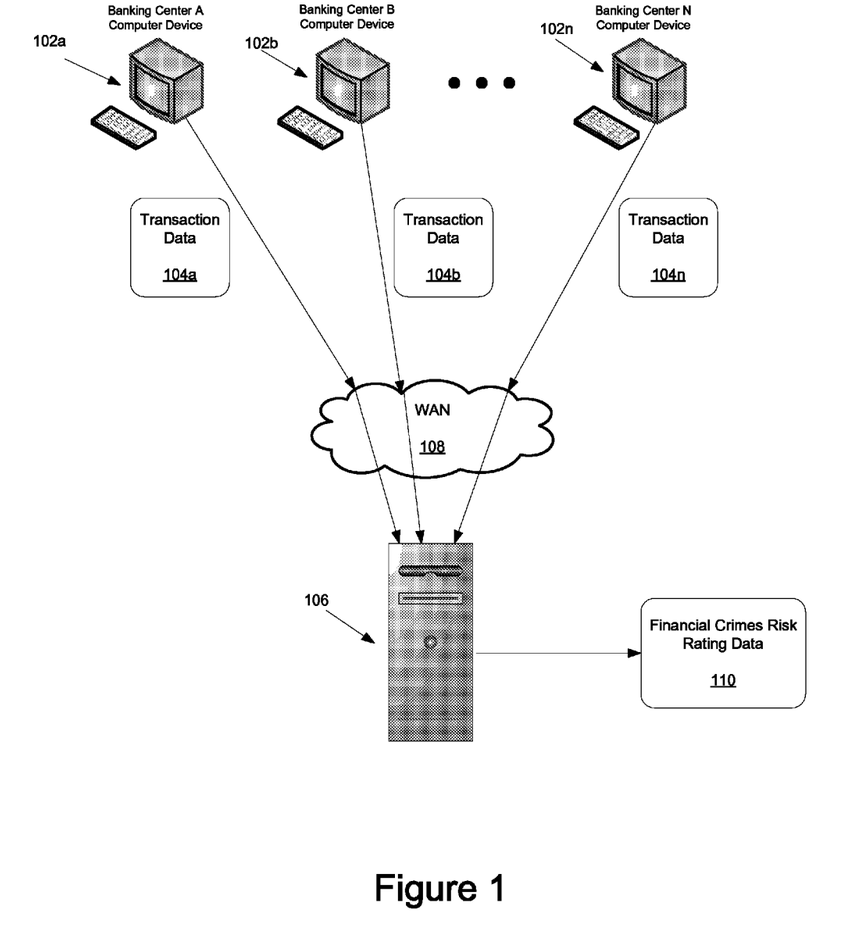
FIG. 1 illustrates a system that may be used to process transaction data and generate financial crimes rating data, in accordance with an embodiment of the invention.

FIG. 1 illustrates a system that may be used to process transaction data and generate financial crimes rating data, in accordance with an embodiment of the invention. A plurality of banking center computer devices 102a, 102b and 102n each provide transaction data 104a, 104b and 104n to a central computer device 106 via a wide area network 108. Transaction data, generally high risk transaction data, may include data relating to wire transactions and data relating to cash transactions and relatively high value cash transactions. High risk transaction data may also include data relating to transactions involving values between just below a government reporting requirement threshold and a predetermined value, such as transactions involving values between $8,000 and $10,000.

Central computer device 106 may process the received high risk transaction data and generate financial crimes rating data 110 for one or more banking centers, customers or other banking entities. The processes performed by central computer device 106 are described below. In some embodiments of the invention banking center computer devices 102a, 102b and 102n provide all transaction data to central computer device 106 and central computer device 106 identifies high risk transaction data. One or more of banking center computer devices 102a, 102b and 102n may also be configured to generate financial crimes rating data for one or more banking centers, customers or other banking entities.

Figure 2:
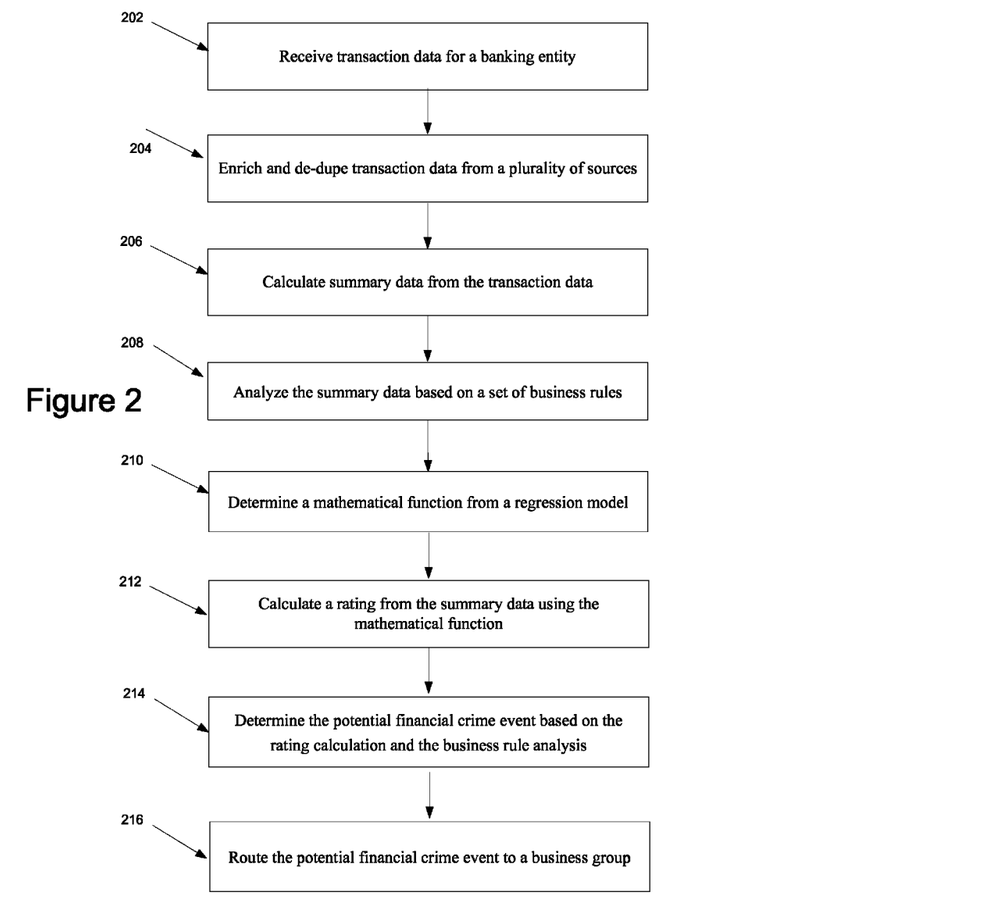
FIG. 2 illustrates a method of assigning financial crimes ratings to an entity, in accordance with an embodiment of the invention.

FIG. 2 illustrates a method of assigning financial crime ratings to an entity in accordance with an embodiment of the invention. First, in step 202 transaction data for a banking entity is received. Exemplary transaction data has been described above. Banking entities may include banking centers, groups of banking centers as well as individual and business banking customers. This transaction data may be obtained from many different sources or multiple sources, such as cash transactions, check history, deposit history, wire transaction history, or many other transactions within the financial area. One skilled in the art will appreciate that this transaction data may be obtained from many different multiple sources available to the financial institution.

Next, in step 204, the transaction data is enriched and further populated. The enriching process may include enriching and supplementing the transaction data account information and identification data with additional account and transactional information from a different source. Enrichment sources may include, ATM transactions, cash transactions, or various other financial sources both internal and external to the financial institution. After the transaction data is enriched, the transaction data can then be de-duped (i.e., further analyzed to identify data sets that may be related to or duplicates of one another). The de-duping of transaction data may include combining multiple transaction data which may have common attributes or may be joined in some way. Some possible areas in which this transaction data may be de-duped may be husband and wife account holders, joint signers on an account, party relationships, or joint account relationships. As discussed below, this enrichment and de-duping information is determined by extracting various information elements from multiple database sources which are both internal and external to the financial institution. One skilled in the art will appreciate that multiple enrichment and de-duping sources from both internal and external sources to the financial institution may be utilized during this step.

Next, in step 206 summary data is calculated from the transaction data. Summary data may include an average, standard deviation and count for each type of transaction included in the transaction data. One skilled in the art will appreciate that other summary data may be used to compare the transaction data of one banking entity to the transaction data of a group of banking entities.

This summary data will then be analyzed based on a set of business rules to determine if this is a potential financial crime event in step 208. These business rules may be applied to any of the possible data elements associated with the summary data. If the business rule is triggered, the associated summary data may be identified as a potential financial crime event. A business rule may be written against any data element that is utilized in the system. An exemplary business rule, for instance, may be any wire transaction greater than $10,000. If the summary data triggers the business rule in step 208, this summary data may be forwarded to step 214, skipping steps 210 and 212. One skilled in the art will appreciate that any number of business rules may be used based on the changing banking entities or the changing financial environment.

Statistical model parameters may then be calculated from historical and intelligence data of similarly situated banking entities in step 210. A plurality of predicted factors from the historical and intelligence data may be used. The statistical model parameters may be calculated from the plurality of predicted factors using a colinearity and binary logistic regression analysis which determines the factors that may be most indicative of a potential financial crime event. These model parameters may change with the changing financial environment and changing banking entities. It will be appreciated that any number of different parameters may be utilized, which can change at any time based on changes within the financial environment, political environment, or client base typology or typography. In an aspect of the disclosure, these model parameters are further verified utilizing model testing to minimize the amount of false positive potential financial crime events. These model parameters may be calculated and verified to minimize the false negatives or missed financial crime events. Some exemplary model parameters may be: number of prior cases, number of prior SARs, number of cash in transactions, check ratio of total, cash 8-10K ratio of total, sum of all cash in, wire ratio of total.

These model parameters may then be used to determine a mathematical function which will be used to calculate a statistical model score or rating. An exemplary mathematical function may be:

$$\text{Rating} = \frac{1}{1 + e^{-(B_0 + B_1 X_1 + B_2 X_2 + B_3 X_3 + B_4 X_4 + B_5 X_5 + B_6 X_6 + B_7 X_7 + B_8 X_8 + B_9 X_9)}}$$

Wherein:
$B_i$=statistical model parameter coefficients which are calculated using the binary logistic regression analysis
$X_i$=statistical model parameter values
Rating=probability that an event or data transaction will ultimately result in potential financial crime event In step 212, the statistical model score or rating may be calculated using the mathematical function determined in step 210. This mathematical function may process the summary data and produce values that will be used to calculating the rating. The rating may be a number between zero (0) and one (1).

Following the calculation in step 212, the potential financial crime events may be determined. The potential financial crime events may be determined based on the business rule analysis in step 208, wherein a specific attribute of the data element triggers the determination of a potential financial crime event. Also, the potential financial crime events may be determined based on the rating calculation from step 212.

When determining the potential financial crime events based on the rating, a threshold rating may be selected. If the rating is above the threshold rating, the summary data may be a potential financial crime event. While, if the rating is below the threshold rating, the summary data may not be a potential financial crime event. Choosing the appropriate threshold rating may take into consideration the risk appetite of the business. If a more conservative approach is needed, a lower threshold may be chosen. In terms of risk, the false negative represents the risk. For example, if too low of a threshold is selected, there may be a high number of false positive/wasted effort cases that are determined to be potential financial crime events. However, the number of false negative/missed potential financial crime events may be low. If too high of a threshold is selected, there may be a lower number of false positive/ wasted effort cases that are determined to be potential financial crime events. However, the number of false negative/missed potential financial crime events may be high. One skilled in the art will appreciate that additional criteria may be used to determine the potential financial crime events.

Following the determination of the potential financial crime events, the summary transaction or potential financial crime event may be routed to a business group in step 216. Once this event is routed to a business group, the business group may further investigate and then take the appropriate action based on the protocol within the financial institution, such as reporting the event to the U.S. Department of Treasury's Financial Crimes Enforcement Network (FinCEN).

The potential financial crime event may be routed based on the background of the business transaction or the banking entity. For example, a predominate wire activity potential financial crime event may be routed to the business team which deals with wire activities. In an aspect of the invention, during this step, the potential financial crime events may be prioritized based on one of many different factors, which include business rules, rating score, or managerial decision-making. For example, the higher the rating score, the higher the probability of a potential financial crime event. Also, there may be higher priority business rules which may trigger a higher prioritization for further investigation and reporting to FinCEN for a potential financial crime event. One skilled in the art will appreciate that other methods for routing and prioritization may be utilized in order to ensure the efficient processing of these potential financial crime events.

In an alternative embodiment of the invention, the process utilizes real-time summary data of the banking entities to calculate the financial crimes rating. In this embodiment, the process may not require the re-calculation of model parameters. As a result, as new transaction data is received and added to a collection of transaction data, the data is used in the mathematical function to determine the rating. This allows for real time calculations and real-time determinations of potential financial crime events.

The ratings calculated with the method shown in FIG. 2 may be used to generate reports, populate graphical user interface elements or otherwise provide information to users. In one embodiment, ratings for a number of banking centers are displayed on a graphical user interface in the form of a map. The ratings may be color coded and the graphical user interface may allow a user to zoom in and out evaluating ratings. For example, a map of the United States may show a high rating for Chicago. The user may interact with the graphical user interface to select Chicago, which will result in the map of the United States being replaced with a map of Chicago that displays color coded ratings for banking centers or neighborhoods. One skilled in the art will appreciate that several levels of granularity may be provided to allow a user zoom into cities, neighborhoods, streets, etc.

Figure 3A:
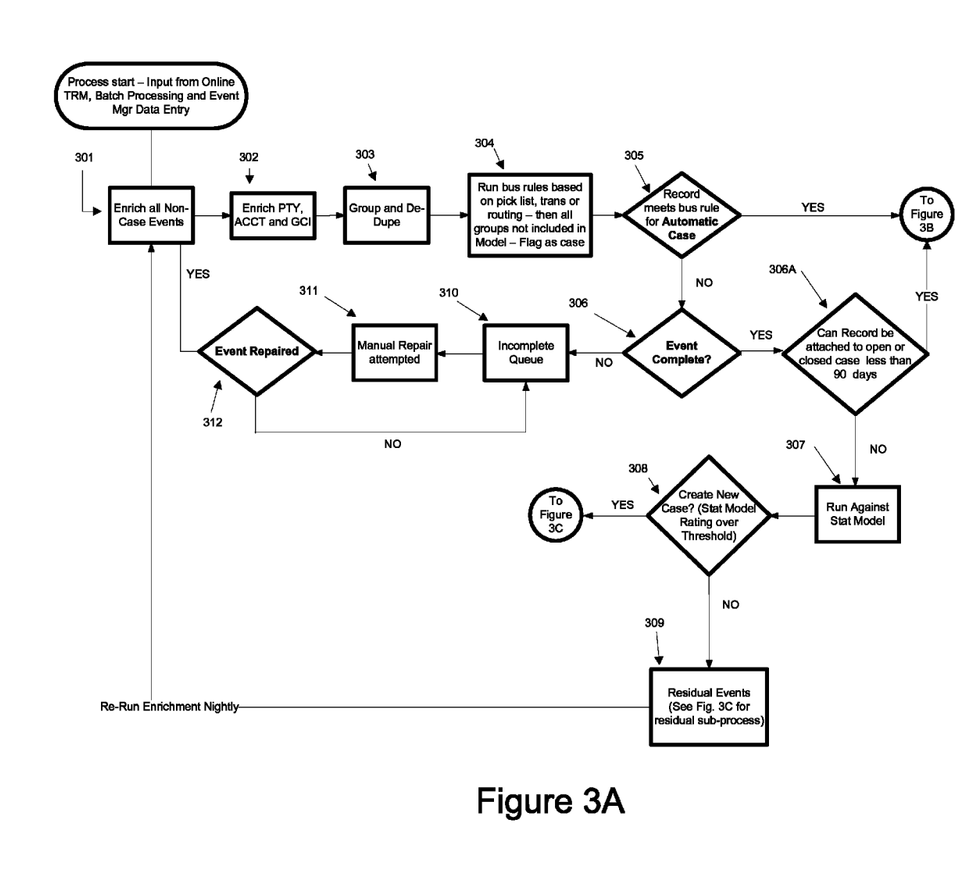
FIGS. 3A, 3B, and 3C illustrate the process from transaction input to case management for a potential financial crime, in accordance with an embodiment of the invention.
Figure 3B:
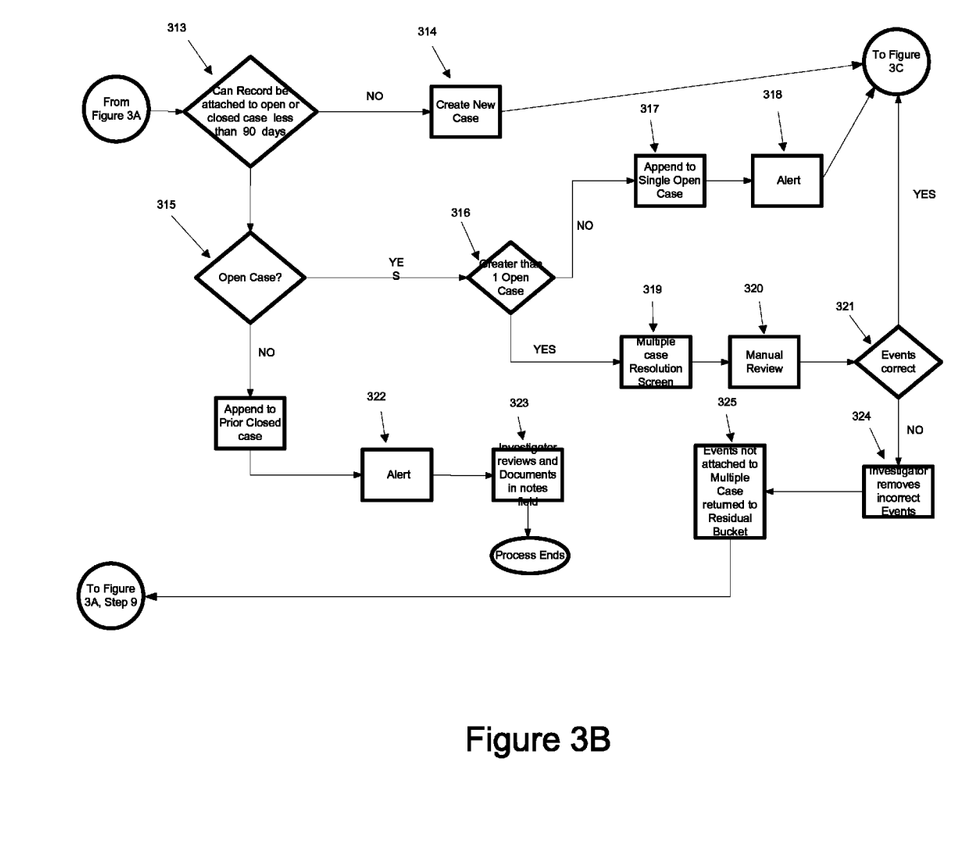
Figure 3C:
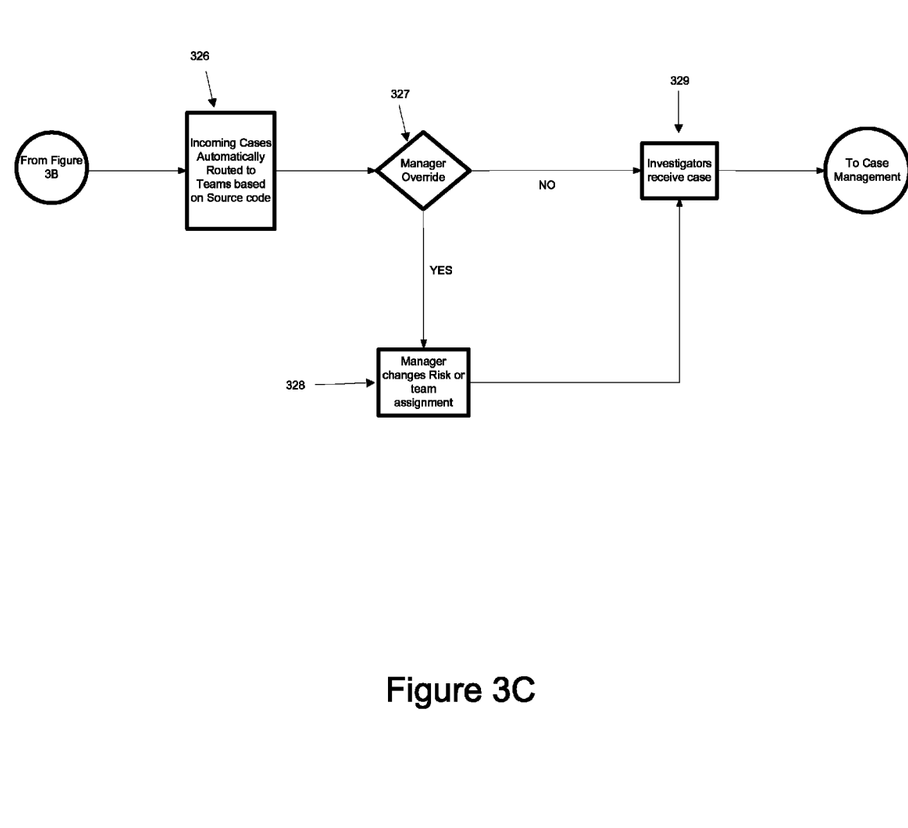

A further embodiment of the invention is illustrated in FIGS. 3A, 3B, and 3C. In this embodiment, the transaction routing from the transaction input to the final case management is illustrated. In step 301 of FIG. 3A, transaction and intelligence data may be gathered from multiple sources in order to begin the transaction evaluation. This transaction and intelligence data may be retrieved by a process, such as the STARR process, from various deposit type systems including, but not limited to: CASH (cash withdrawals and deposits), 8-10K CASH (cash withdrawals and deposits greater than 8-10 thousand dollars), CHECK HIST (check history), CTR, DEPOSIT HIST (deposit history), ATM (automated transaction machine transactions), HIGH RISK ATM (high risk automated transaction machine information), WIRE HIST (wire deposit history), HIGH RISK WIRE DATA (high risk wire deposit information), PRIOR SAR (prior Suspicious Activity Report), PRIOR CASE (prior determined high risk case), GSS (global security services), and SURVEILLANCE (intelligence information).

In steps 302-303 in FIG. 3A, the inputted transactions may be enriched from either non-case events or party name, account name, business name, and global customers. Enrichment sources may include, but is not limited to, any of the following sources: California, NW, IDS, WBS, ATM, CASH, F/X, BAS, ACH, Military Bank, as well as internal or company databases. Some of these sources, such as California and NW, are standard systems, products, or business practices which help deliver a common, consistent customer experience for a specific geographic region. Other sources, such as WBS (Wholesale Banking System) and IDS (Integrated Deposit System) are systems of record for large institutional deposit accounts. From these systems, Demand Deposit Account and Savings Account information may be retrieved. Following the enrichment step, the party name, account name, or business name may then be grouped and de-duped.

In steps 304 and 305, the transactions may be run against a set of selected business rules, with those transactions that trigger a business rule moving on to FIG. 3B as a potential financial crime event. This potential financial crime event may be also identified as record or case. For those transactions that do not trigger a business rule, the transaction will be reviewed to determine if it may be attached to an open or closed case in step 306A, and otherwise, the transaction may be run against the statistical model in steps 307 and 308. If it is determined that the transaction will be created into a new case and the rating from the statistical model is above the threshold rating, then the transaction may move on to FIG. 3C as a potential financial crime event. In steps 309-312, the transaction may be re-directed to the enrichment step to fill in incomplete data or further enrich or de-dupe the transaction as required.

In FIG. 3B, the identified potential financial crime event may be routed through various checks and reviews. Some exemplary checks and reviews may include whether the event was previously opened as an event during the past ninety (90) days, whether there was more than one event open surrounding this transaction, or whether this case requires manual review. Following these checks and reviews, the potential financial crime event, may move on the FIG. 3C for further routing, or the event may be re-routed to FIG. 3A for additional enrichment and de-duping as required.

In FIG. 3C, the identified potential financial crime event may be automatically routed to teams based on the source transaction or rating score. In step 327, a manager may override the automatic routing in order to ensure the correct team is working on the correct source transactions. In step 329, the investigator will receive the potential financial crime event for further investigation and possible action which may include reporting to FinCEN. One skilled in the art will appreciate that FIGS. 3A, 3B, and 3C represent a possible embodiment for the routing of a transaction through the process of statistically determining a potential financial crime event, and that modifications to the routing and steps may exist.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. All are considered within the sphere, spirit, and scope of the invention.

We claim:

1. A computer implemented method of identifying potential financial crime events comprising:
    (a) receiving, at a central computer device, information relating to a bank transaction from a banking center computer device associated with a banking entity, wherein the bank transaction includes one or more of the following: a wire transaction, a high value cash transaction, a transaction involving values between just below a government reporting threshold and a predetermined value, deposit history, check history, and a brokerage transaction;

(b) retrieving, by the central computer device, a set of data relating to the bank transaction from at least one of two or more first computer systems, wherein the retrieving further includes:
  (i) enriching, by the central computer device, the bank transaction with additional data from at least one of two or more second computer systems, wherein at least one of the two or more second computer systems is different than the two or more first computer systems; and
  (ii) analyzing, by the central computer device, the enriched bank transaction based on the data from at least one of the two or more first computer systems and the data from at least one of the two or more second computer systems to thereby identify related and duplicated data from data retrieved from the two or more first computer systems and the additional data from the two or more second computer systems in combining multiple bank transaction data;
(c) calculating, by the central computer device, summary data from the set of data;
(d) analyzing, by the computer device, the summary data based on a set of business rules;
(e) calculating, by the central computer device, a rating from the summary data using a mathematical function, the mathematical function determined from a regression model, wherein calculating the rating includes:
  (i) calculating, by the central computer device, a set of model parameters from a set of historical and intelligence data for the banking entity; and
  (ii) evaluating, by the central computer device, the model parameters and the set of historical and intelligence data for the banking entity to determine the function;
(f) determining, by the central computer device, a potential financial crime event based on the rating being greater than a threshold value;
(g) routing, by the central computer device, the potential financial crime event to a business group, wherein the routing is based on a prioritization from the rating calculation;
(h) displaying, by the central computer device, the rating on a display device;
(i) generating a report that lists the ratings for multiple banking entities; and
(j) displaying a graphical user interface that displays ratings for multiple banking entities, wherein the ratings are color coded.

2. The method of claim 1, wherein the banking entity comprises a banking center.

3. The method of claim 1, wherein the banking entity comprises a bank customer.

4. The method of claim 3, wherein the bank customer is an individual.

5. The method of claim 1, wherein the summary data includes one or more of the following: a count for each type of transaction, an average for each type of transaction, and a standard deviation for each type of transaction.

6. The method of claim 1, wherein (d) is performed using real time summary data of the banking entity.

7. The method of claim 1, wherein the function is determined by a regression model which utilizes a plurality of predicted factors.

8. The method of claim 1, wherein the determination of the potential financial crime event is based on the rating being greater than a threshold value, wherein the rating is a value between zero and one.

9. A computer implemented method of identifying potential financial crime events comprising:

(a) receiving, at a computer device, information relating to a bank transaction from a computer system associated with a banking entity, wherein the bank transaction includes one or more of the following: a wire transaction, a high value cash transaction, a transaction involving values between just below a government reporting threshold and a predetermined value, deposit history, check history, and a brokerage transaction;
wherein the banking entity comprises a banking center, bank customer, or an individual;
  (b) retrieving, by the computer device, a set of data relating to the bank transaction from one or more sources included in a first plurality of sources, wherein step (b) further comprises:
    (i) enriching, by the computer device, the bank transaction with additional data from one or more sources included in a second plurality of sources, wherein the one or more sources included in the second plurality of sources is different than the one or more sources included in the first plurality of sources, and
    (ii) analyzing, by the computer device, the enriched bank transaction based on the data from the first plurality of sources and based on the data from the second plurality of sources to thereby identify related and duplicate data from both the first plurality of sources and the second plurality of sources in combining multiple bank transaction data;
  (c) calculating, by the computer device, summary data from the set of data;
  (d) analyzing, by the computer device, the summary data based on a set of business rules;
  (e) calculating, by the computer device, a rating from the summary data using a mathematical function, wherein the mathematical function is determined from a regression model, wherein step (e) further comprises:
    (i) calculating, by the computer device, a set of model parameters from a set of historical and intelligence data for the banking entity to determine the mathematical function, and
    (ii) evaluating, by the computer device, the model parameters and the set of historical and intelligence data for the banking entity to determine the mathematical function;
  (f) determining, by the computer device, a potential financial crime event wherein the determination of the potential financial crime event is based on the rating being greater than a threshold value;
  (g) routing, by the computer device, the potential financial crime event to a business group, wherein the routing is based on a prioritization from the rating calculation;
  (h) displaying, by the computer device, the rating on a display device;
  (i) generating a report that lists the ratings for multiple banking entities; and
  (j) displaying a graphical user interface that displays ratings for multiple banking entities, wherein the ratings are color coded.

10. A non-transitory computer-readable medium containing computer-executable instructions for causing a computer device to perform the steps comprising:
  (a) receiving information relating to a bank transaction from a banking entity;
  (b) retrieving data relating to the bank transaction from at least one source included in a first plurality of sources, wherein the retrieving further comprises:
    (i) enriching the bank transaction with additional data from at least one source included in a second plurality of sources, wherein the second plurality of sources is different than the first plurality of sources, and (ii) analyzing the enriched bank transaction based on the data from the first plurality of sources and based on the data from the second plurality of sources to thereby identify related and duplicate data from both the first and the second plurality of sources in combining multiple bank transaction data;

(c) calculating summary data from the data relating to a bank transaction;

(d) analyzing the summary data based on a set of business rules;

(e) calculating a rating from a mathematical function, wherein the mathematical function is determined from a regression model, wherein the mathematical function is determined, at least in part, by;

(i) calculating a set of model parameters from a set of historical and intelligence data for the banking entity; and (ii) evaluating the model parameters and the set of historical and intelligence data for the banking entity;

(f) determining a potential financial crime event wherein the determination of the potential financial crime event is based on the rating being greater than a threshold value; and (g) routing the potential financial crime events to a business group, wherein the routing is based on a prioritization from the rating calculation; and (h) displaying the rating on a display device, generating a report that lists the ratings for multiple banking entities, or displaying a graphical user interface that displays ratings for multiple banking entities, wherein the ratings are color coded.

* * * * *